United States Patent [19]

Tatsumi et al.

[11] Patent Number: 4,928,167
[45] Date of Patent: May 22, 1990

[54] METHOD OF AND APPARATUS FOR EXECUTING TONE CORRECTION ON AN IMAGE ACCORDING TO A CORRECTION LEVEL

[75] Inventors: Setsuji Tatsumi; Kazuo Shiota; Hitoshi Urabe; Osamu Shimazaki, all of Kaisei, Japan

[73] Assignee: Fuji Photo Film Co., Ltd., Kanagawa, Japan

[21] Appl. No.: 80,762

[22] Filed: Aug. 3, 1987

[30] Foreign Application Priority Data

Sep. 2, 1986 [JP] Japan .................... 61-205177

[51] Int. Cl.⁵ .......................... G03F 3/08; H04N 1/46
[52] U.S. Cl. .................................. 358/80; 358/75
[58] Field of Search ........................ 358/75, 78, 80

[56] References Cited

U.S. PATENT DOCUMENTS

| | | | |
|---|---|---|---|
| 3,634,611 | 1/1972 | Pugsley et al. | 358/80 |
| 4,096,519 | 6/1978 | Hoffrichter et al. | 358/80 |
| 4,136,360 | 1/1979 | Hoffrichter et al. | 358/80 |
| 4,305,094 | 12/1981 | Yamada | 358/80 |
| 4,371,260 | 2/1983 | Yoshimoto et al. | 358/75 |
| 4,396,940 | 8/1983 | Tanaka et al. | 358/80 |
| 4,410,909 | 10/1983 | Ueda et al. | 358/80 |
| 4,468,693 | 8/1984 | Fujita et al. | 358/75 |
| 4,472,736 | 9/1984 | Ushio et al. | 358/80 |
| 4,639,769 | 1/1987 | Fleisher et al. | 358/37 |
| 4,667,228 | 5/1987 | Kawamura et al. | 358/80 |
| 4,727,434 | 2/1988 | Kawamura | 358/80 |
| 4,729,016 | 3/1988 | Alkofer | 358/80 |
| 4,731,662 | 3/1988 | Udagawa et al. | 358/80 |
| 4,745,465 | 5/1988 | Kwon | 358/80 |

FOREIGN PATENT DOCUMENTS

| | | | |
|---|---|---|---|
| 3435538 | 4/1986 | Fed. Rep. of Germany | 358/80 |
| 58-195847 | 11/1983 | Japan | 358/80 |
| 60-37878 | 2/1985 | Japan | 358/75 |
| 60-105375 | 6/1985 | Japan | 358/75 |
| 60-216350 | 10/1985 | Japan | 358/80 |
| 60-216353 | 10/1985 | Japan | 358/80 |
| 60-236578 | 11/1985 | Japan | 358/80 |

Primary Examiner—James J. Groody
Assistant Examiner—Randall S. Svihla
Attorney, Agent, or Firm—Birch, Stewart, Kolasch & Birch

[57] ABSTRACT

Tone correction for input video signals is performed on the basis of look-up table data. The state of color tone is decided by using chroma signals each corresponding to one of input video signals, and a luminance signal produced from the input video signals. In response to the particular state decided, signals are produced by applying color correction level adjustment to the input video signals. A highlight point and a shadow point are set up based on one of such adjusted signals so as to produce look-up table data for each of the input video signals. This allows input video data to be subjected to tone correction which corresponds to particular photographing conditions, thereby eliminating overcorrection or undercorrection. Hence, the operator's decision as to the state of color tone is needless so that the ease of operation is promoted.

14 Claims, 4 Drawing Sheets

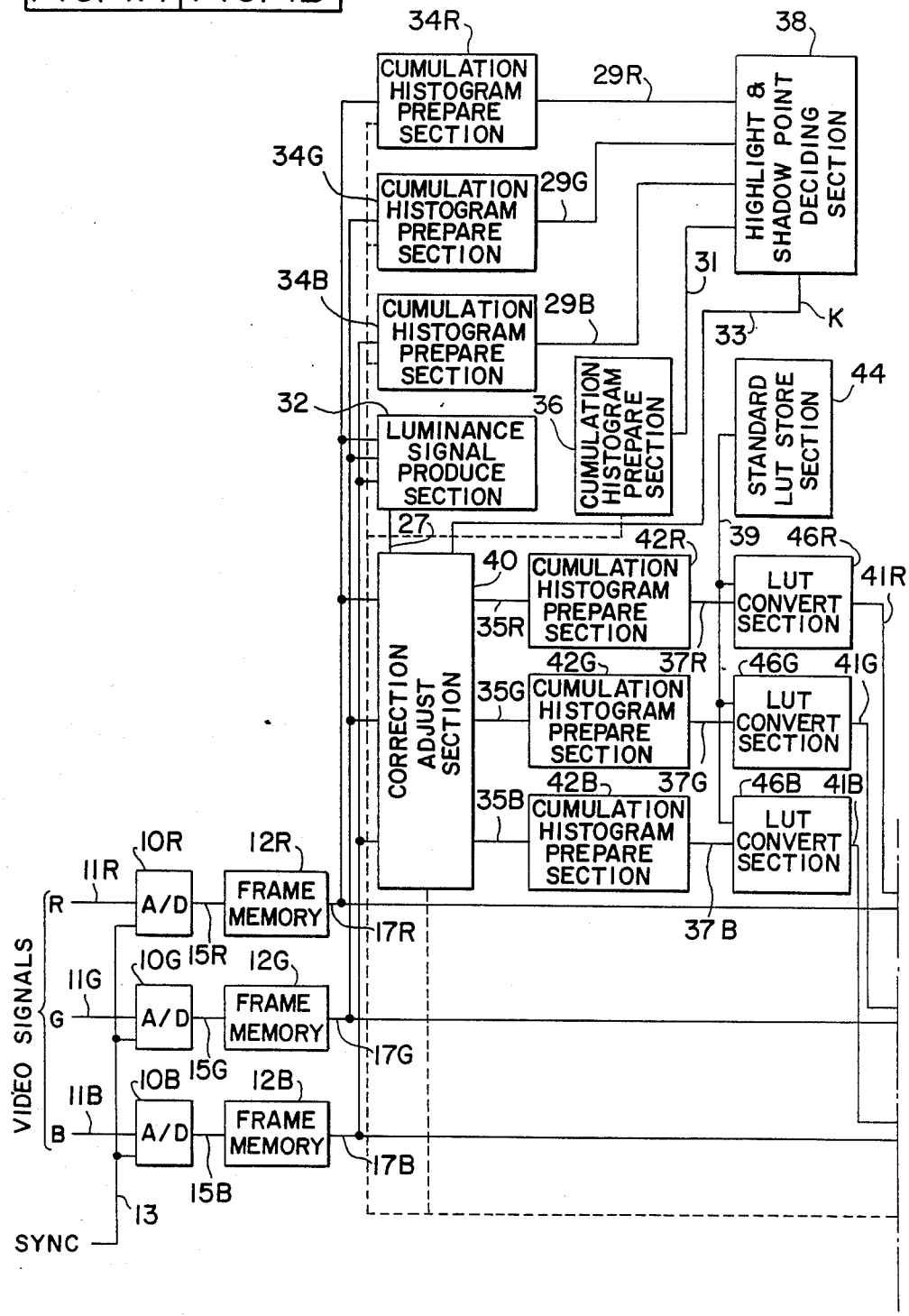

METHOD OF AND APPARATUS FOR EXECUTING TONE CORRECTION ON AN IMAGE ACCORDING TO A CORRECTION LEVEL

BACKGROUND OF THE INVENTION

1. Field of the Invention

The present invention relates to a method of and an apparatus for processing an image and, more particularly, to an image processing method and an apparatus for the same which execute effective tone correction while a still image represented by a video signal is recorded in an image recording medium to provide a visible image.

2. Description of the Prior Art

In the imaging art, there has been proposed a still image recording apparatus which receives a video signal read out of a video floppy disk, a video tape and other video signal recording media so as to reproduce a visible image in an image recording medium such as a printing paper. In this type of apparatus, a red (R), a green (G) and a blue (B) color signal, for example, which are produced from input video signals are sequentially fed to a high luminance black-white cathode ray tube (CRT) which is exclusively adapted for recording. A lens and a color separating filter for separating three colors are positioned in front of the screen of the recording CRT, so that an image appearing on the screen may be focused onto a color printing paper. While a cyan (C), a magenta (M) and a yellow (Y) coloring matter in the printing paper are stimulated to color to provide a color image, a prerequisite is that the color signals R, G and B derived from the individual input video signals and the signals applied to the recording CRT for stimulating the C, M and Y coloring matters be inversely related to each other with respect to the level. For example, when the levels of the color signals R, G and B are relatively high representing a light portion of a picture, the coloring degree of the C, M and Y coloring matters has to be suppressed to render the lightness and, therefore, the outputs associated with the respective color signals R, G and B have to be lowered in level.

Another prerequisite with the above-described type of apparatus is that the difference between the density of each color of an image as represented by input video signals and those of a actual image be compensated for, the difference being ascribable to the lighting, the kind of a camera used, and other photographing conditions. For example, it sometimes occurs that incoming color signals R, G and B are different in maximum level from each other, despite that an actual image includes a white portion where the colors R, G and B are equal in intensity and maximum in level. In such a condition, should the input color signals R, G and B be fed out without any compensation, a portion which should be rendered, for example, in white would be recorded in a recording medium in a color which is close to any of the three colors, due to the difference between the levels of the color signals R, G and B. To compensate for the different levels of input color signals R, G and B, tone correction is applied to the signals R, G and B by using look-up tables each of which contains output level data associated with a respective one of the signals R, G and B. The previously stated conversion of signal levels is effected by such tone correction.

The data in the look-up tables are such that when an image includes a white portion, a highlight and a shadow point representative of a maximum and a minimum level, respectively, are determined for each of the input color signals R, G and B, and the output levels of the individual color signals R, G and B corresponding to the highlight and shadow points are caused to agree with each other. This allows the color signals R, G and B representative of the white portion to be delivered with equal intensity, whereby the white portion is reproduced in white.

The highlight and shadow points may be determined by preparing a cumulation histogram which shows a frequency distribution of video signals of respective pixels of an input video signal which constitute one frame of image. Then, a point where the cumulation histogram shows, for example, 99% is determined to be the highlight point. Specifically, an input video signal of a particular level at which the proportion of those pixel signals which are lower than that level to all of the pixel signals is 99% is determined to be the highlight point.

In a tone correcting method known in the art, a cumulation histogram is produced by using a luminance signal Y of input video signals, then a highlight and a shadow point are set up on the basis of that cumulation histogram, and then look-up tables for the tone correction of respective color signals R, G and B are prepared by applying those highlight and shadow points to all of the three color signals R, G and B. This kind of tone correcting method is usable under a so-called low correction condition. This method, however, is incapable of compensating for the difference in tone between input video signals and an actual image as previously mentioned, because it does not give consideration to the difference between the levels of the color signals R, G and B of the input video signals.

Another approach for tone correction, which is applicable to so-called high correction, consists in preparing one cumulation histogram for each of the color signals R, G and B of input video signals, then determining a highlight and a shadow point based on each of such histograms, and then producing one look-up table for each of the color signals R, G and B. A problem with this approach is as follows. Assuming that the color signal R, for example, includes a portion of significantly high level representative of a light image portion, the highlight point of the signal R is selected to be higher than those of the other color signals G and B resulting that the output corresponding to the signal R becomes weak to render cyan (C), which is complementary to red (R), dark in a reproduced picture and, thereby, disturbs the color balance. Specifically, while no problem arises so long as an image represented by input video signals includes a perfect white portion, the above-stated undesirable phenomenon occurs when it does not include a perfect white portion while, at the same time, any of the input signals is representative of a pure color of high chroma and high level; the image subjected to tone correction which uses look-up tables would appear disturbed in color balance. That is, the image would undergo overcorrection to be thereby reproduced with different tones from those of the actual image.

It follows from the above that adequate tone correction is unattainable unless the low correction, high correction and a certain degree of correction between the high and low correction are effected alternatively depending on the image which is represented by input video signals. Such adjustment of correction level has customarily relied on operator's eyesight. For example, while watching an image represented by tone-corrected video signals on a monitor, the operator selects high correction when decided that the image includes a perfect white portion and selects low correction when decided that the image does not include a white portion and includes a portion of a color, other than white, which is high in chroma and light. However, although the operator watching the monitor may decide that the image includes a white portion, it is difficult for the operator to determine whether or not that white portion is highlight white, i.e., perfect white represented by the highest levels of the color signals R, G and B. It is also difficult for the operator to see if the image includes a portion of a color, other than white, which has high chroma. This kind of adjustment, therefore, not only consumes a disproportionate period of time but also needs skilled labor.

SUMMARY OF THE INVENTION

It is therefore an object of the present invention to provide an image processing method and an apparatus therefore capable of performing effective tone correction, i.e., compensation for a difference between input signals and an actual image by adequately deciding a required degree of correction to avoid overcorrection.

In accordance with the present invention, there is provided an image processing method which processes input video signals by use of look-up table data and delivers the resultant signals. There are produced signals each corresponding to a particular frequency value of an accumulation histogram, which is prepared by using a respective one of chroma signals of input video signals, and a signal corresponding to a particular frequency value of an accumulation histogram prepared by using a chrominance signal of the input video signals. These signals corresponding to the particular frequency values are subjected to arithmetic operations for comparison so as to select a particular degree of color correction level. Signals are produced by applying color correction level adjustment to the input video signals according to the degree of color correction level selected. A highlight point and a shadow point are determined for each of the input video signals based on the adjusted versions of the latter. Look-up table data which match with the individual input video signals are produced on the basis of the highlight and shadow points. An image is processed by using the look-up table data produced.

In accordance with the present invention, there is also provided an image processing apparatus which includes image processing means for processing input video signals by use of look-up table data and delivers the resultant signals. Chroma signal cumulation histogram preparing means prepare cumulation histograms each corresponding to a chroma signal of a respective one of the input video signals. A luminance signal accumulation histogram preparing means prepares a cumulation histogram based on a luminance signal of the input video signals. A color correction level deciding means decides a degree of color correction level by applying arithmetic operations for comparison to signals each corresponding to a particular frequency value of the cumulation histogram of a respective one of the chroma signals prepared by the chroma signal cumulation histogram preparing means, and a signal corresponding to a particular frequency value of the luminance signal cumulation histogram prepared by the luminance signal cumulation histogram preparing means. A color correction level adjusting means applies color correction level adjustment to the input video signals according to the degree of color correction level selected by the color correction level deciding means. Highlight and shadow point setting means determine a highlight point and a shadow point of each of the signals whose color correction level has been adjusted by the color collection level adjusting means. Look-up table preparing means produce look-up table data which match with the individual input video signals on the basis of the highlight and shadow points, delivering those data to the image processing means.

BRIEF DESCRIPTION OF THE DRAWINGS

The objects and features of the present invention will become more apparent from the consideration of the following detailed description taken in conjunction with the accompanying drawings in which:

FIGS. 1A and 1B, when combined as shown in FIG. 1, are a block diagram showing an image recording device to which an image processing apparatus of the present invention is applied;

DESCRIPTION OF THE PREFERRED EMBODIMENT

A method and an apparatus for processing an image in accordance with the present invention will be described in detail hereinafter.

Figure 1B:
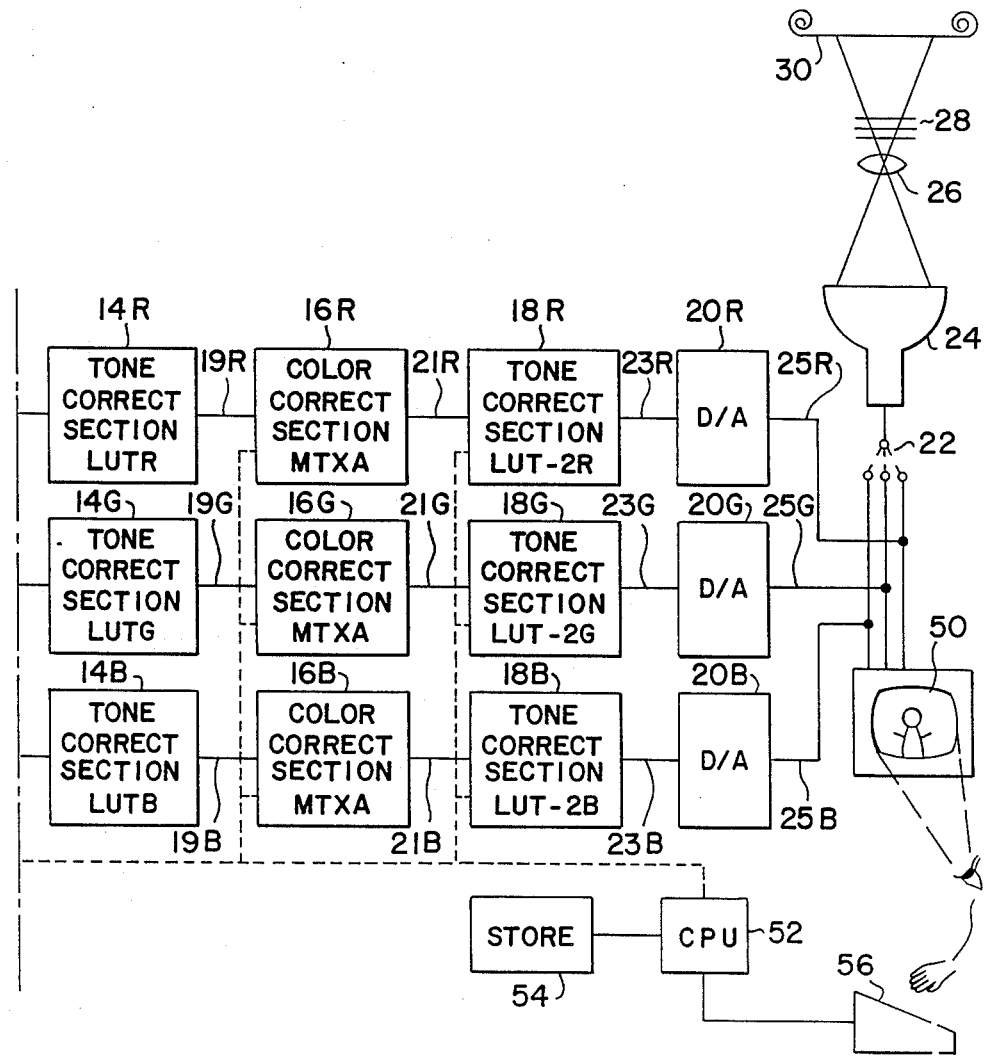

Referring to FIGS. 1A and 1B of the drawings, an image recording device to which the image processing principle of the present invention is applied is shown. As shown, the apparatus includes analog-to-digital (AD) converters 10R, 10G and 10B having inputs 11R, 11G and 11B, respectively. Video signals output by a video floppy playback unit or like video signal source is applied to the inputs 11R, 11G and 11B as three primary color signals R (red), G (green) and B (blue). Timed to a synchronizing signal SYNC13, the AD converters 10R, 10G and 10B convert, respectively, the input video signals 11R, 11G and 11B into digital data. The outputs 15R, 15G and 15B of the AD converters 10R, 10G and 10B are fed to frame memories 12R, 12G and 12B, respectively.

The frame memories 12R, 12G and 12B are individually adapted to store signal data representative of respective pixels which constitute one frame of image. The output signals 17R, 17G and 17B of the frame memories 12R, 12G and 12B are applied to tone correcting sections 14R, 14G and 14B, respectively.

The tone correcting sections 14R, 14G and 14B are respectively provided with look-up tables LUTR, LUTG and LUTB adapted for tone correction, and each plays the role of a parameter correcting section for tone correction. The look-up tables LUTR, LUTG and LUTB contain data for converting, respectively, the input video signals 17R, 17G and 17B into signals which are to be fed to a high luminance black-white cathode ray tube (CRT) 24 so as to stimulate cyan (C), magenta (M) and yellow (Y) coloring matters to color in a color printing paper 30. Further, by the conversion of signal levels based on the look-up tables LUTR, LUTG and LUTB, the difference of an image represented by the input video signals from an actual image is compensated for to provide tones which are close to those of the actual image.

Figure 2:
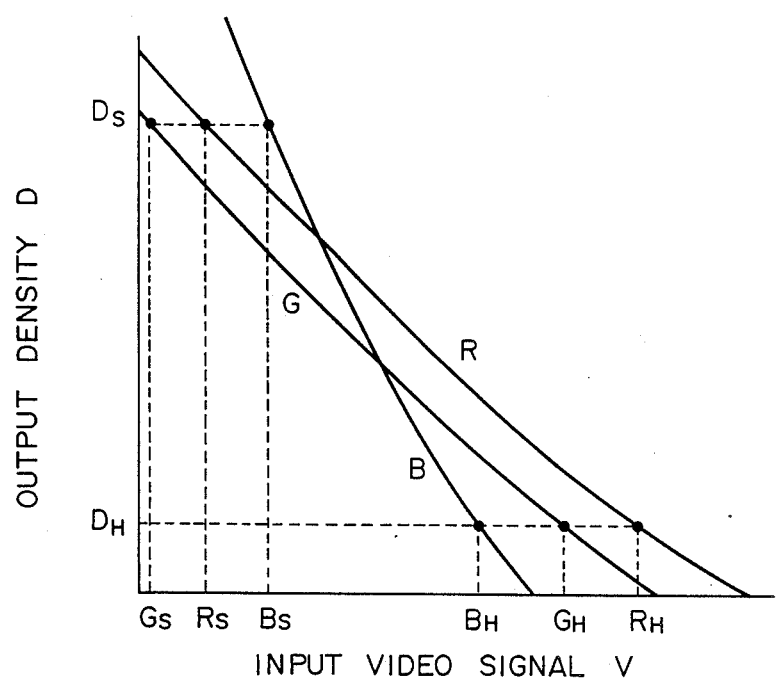
FIG. 2 is a plot showing examples of look-up tables LUTR, LUTG and LUTB each being stored in a respective one of tone correcting sections of FIG. 1.

Referring to FIG. 2, examples of the look-up tables LUTR, LUTG and LUTB are shown. In FIG. 2, the abscissa is representative of the levels of input video signals v and the ordinate, the levels of density signals D outputted. Based on such R, G and B look-up tables LUTR, LUTG and LUTB, the input video signals R, G and B, i.e., v are individually converted into output signals each representing density D.

In FIG. 2, those points $R_H$, $G_H$ and $B_H$ of the input video signals R, G and B which are close to their highest levels are the highlight points, and those points $R_S$, $G_S$ and $B_S$ close to the lowest levels are the shadow points. The density D of output signals which correspond to the highlight points $R_H$, $G_H$ and $B_H$ of the input video signals R, G and B is assumed to have a constant value $D_H$. Likewise, the density D of output signals which corresponds to the shadow points $R_S$, $G_S$ and $B_S$ of the input video signals R, G and B are assumed to have a constant value $D_S$. In the event of setting up the curves representative of data of the look-up tables LUTR, LUTG and LUTB as shown in FIG. 2, primary importance is attached to the highlight points $R_H$, $G_H$ and $B_H$ and the shadow points $R_S$, $G_S$ and $B_S$. As regards the curve associated with the look-up table LUTR, for example, it is so determined as to extend through the highlight point ($R_H$, $D_H$) and the shadow point ($R_S$, $D_S$).

Figure 3:
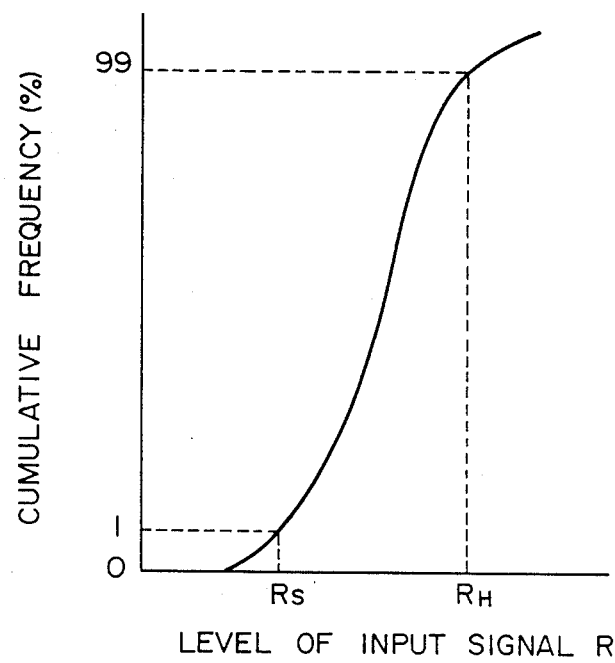
FIG. 3 is a plot showing an exemplary cumulation histogram associated with one of the input video signals as shown in FIG. 1.

The highlight points and the shadow points mentioned above are determined as follows. A cumulation histogram is prepared for each of the input video signals R, G and B such as shown in FIG. 3. The cumulation histogram of FIG. 3 is associated with the input video signal R and representative of, for example, a frequency distribution of video signals of respective pixels which constitute one frame of picture. In FIG. 3, the abscissa shows the levels of the input video signal R, and the ordinate shows, with respect to a certain point of the curve in the histogram, the ratio (%) of the cumulative number of pixels having lower video signal levels than the particular input video signal level to the total number of pixels which constitute one frame of picture.

Specifically, in FIG. 3, the highlight point $R_H$ shows that 99% of the video signals which are associated with the respective pixels have lower levels than the level $R_H$. In this manner, a point where the cumulation histogram is, for example, 99% is selected to be the highlight point. Likewise, the shadow point $R_S$ shows that 1% of the video signals which are associated with the respective pixels have lower levels than the level $R_S$, and it is set at a point where the cumulation histogram is, for example, 1%.

The output density corresponding to the highlight point and that corresponding to the shadow point are selected to be the previously stated constant values $D_H$ and $D_S$, respectively. By using the values $D_H$ and $D_S$, the curve of the look-up table LUTR which passes through the highlight point ($R_H$, $D_H$) and shadow point ($R_S$, $D_S$) is set up.

Turning back to FIG. 1, the outputs 19R, 19G and 19B of the tone correcting sections 14R, 14G and 14B are routed, respectively, through color correcting sections 16R, 16G and 16B, tone correcting sections 18R, 18G and 18B, and digital-to-analog (DA) converters 20R, 20G and 20B to a switch 22 and a video monitor 50. The inputs 25R, 25G and 25B to the switch 22 are selected alternatively by the switch 22 to be fed to the CRT 24. A lens 26 and a three-color separating filter 28 are disposed in front of the screen of the CRT 24 so as to focus a picture appearing on the CRT 24 onto the color printing paper 30. On the other hand, the video monitor 50 responsive to the inputs 25R, 25G and 25B produces a tone-corrected picture thereon.

Provided with a color correction matrix MTXA, each of the color correcting sections 16R, 16G and 16B serves as a parameter correcting section adapted to compensate for a difference in hue characteristic between the video signal source and the photosensitive material. Assuming that the video signal source is a television (TV) camera by way of example, a matrix coefficient for compensating for a difference in hue between the TV camera and the printing paper 30 is used for the color correction matrix MTXA. As a result, the outputs 21R, 21G, 21B are corrected in hue.

The tone correcting sections 18R, 18G and 18B are respectively provided with tone correction look-up tables LUT-2R, LUT-2G and LUT-2B to serve as parameter correcting sections, each of which is adapted to compensate for a difference in tone characteristic between the CRT 24 and the printing paper 30. The outputs 23R, 23G and 23B of the tone correcting sections 18R, 18G and 18B are applied to, respectively, the DA converters 20R, 20G and 20B to be converted into analog signals. Further, the analog outputs 25R, 25G and 25B of the DA converters 20R, 20G and 20B are fed to the switch 22 and video monitor 50.

The analog signals 25R, 25G and 25B are selected alternatively by the switch 22 and delivered to the CRT 24. As previously stated, the lens 26 and color separating filter 28 are located in front of the screen of the CRT 24 so as to focus an image appearing on the CRT 24 onto the printing paper 30. The switch 22 plays the role of a selector for alternatively applying the separated color signals 25R, 25G and 25B output by the DA converters 20R, 20G and 20B to the CRT 24. On the other hand, the video monitor 50 responsive to the color signals 25R, 25G and 25B displays a tone-corrected image thereon, so that the operator may perform necessary manual operations while watching the video monitor 50.

A central processing unit (CPU), or controller, 52 functions to control the operation of the entire image processing apparatus and may advantageously be implemented with a microprocessor or like processing system. The CPU 52 is connected to cumulation histogram preparing sections 34R, 34G, 34B and 36, a correction adjusting section 40, the color correcting sections 16R, 16G and 16B, and the tone correcting sections 18R, 18G and 18B. Connected to the CPU 52 is a store 54 which stores the values of various parameters for setting up the color correction matrix MTXA and look-up tables LUT-2R, LUT-2G and LUT-2B.

A keyboard or like operating unit 56 is connected to the CPU 52 to allow the operator to, for example, select and correct the image processing parameters of the look-up tables LUT-2R, LUT-2G and LUT-2B and enter an image record command and others. Also entered on the operating unit 56 are particular values of frequency of cumulation histograms which are to be output by the cumulation histogram preparing sections 34R, 34G and 34B, as described in detail later.

The output signals 17R, 17G and 17B of the frame memories 12R, 12G and 12B are fed to a luminance signal producing section 32 and, respectively, to the cumulation histogram preparing sections 34R, 34G and 34B. The luminance signal producing section 32 produces a luminance signal Y by using the input signals 17R, 17G and 17G and an equation $Y=0.3R+0.59G+0.11B$, applying its output 27 to the correction adjusting section 40.

Each of the cumulation histogram preparing sections 34R, 34G and 34B arranges the levels of data representative of respective pixels of one frame of picture in order of level, then calculates the ratio of cumulation of those data which are lower than each input video signal level to the entirety, and then prepares a cumulation histogram as shown in FIG. 3. The cumulation histogram preparing section 36 functions in the same manner as the above sections 34R, 34G and 34B. The cumulation histogram preparing sections 34R, 34G and 34B prepare cumulation histograms of their associated chroma signals based on the output signals 17R, 17G and 17B of the frame memories 12R, 12G and 12B. The outputs 29R, 29G and 29B of the sections 34R, 34G and 34B each being representative of an input video signal level of a particular frequency value of the cumulation histogram are delivered to a highlight and shadow point deciding section 38.

The cumulation histogram preparing section 36 prepares a cumulation histogram of the luminance signal 27 based on the output signal 27 of the luminance signal producing section 32. The output 31 of this section 36 which is representative of an input video signal level of a particular frequency value of the histogram is also fed to the highlight and shadow point deciding section 38.

It is to be noted that the signals 17R, 17G and 17B applied to, respectively, the cumulation histogram preparing sections 34R, 34G and 34B and the signal 27 applied to the cumulation histogram preparing section 36 may be implemented with sampled data, instead of data of all of the pixels which constitute one frame of image.

The highlight and shadow deciding section 38 compares the outputs 29R, 29G and 29B of the cumulation histogram preparing sections 34R, 34G and 34B with the output 31 of the cumulation histogram preparing section 36, in order to decide whether or not a highlight point or a shadow point exists therein. For this decision, use is made of an equation:

$$\Delta_h{}^| = 0.3 \text{ histo}(R)_h{}^| + 0.59 \text{ histo}(G)_h{}^| + 0.1 \text{ histo}(B)_h{}^| - \text{histo}(Y)_h{}^|$$

where $\text{histo}(R)_h{}^|$, $\text{histo}(G)_h{}^|$ and $\text{histo}(B)_h{}^|$ are respectively the input video signal levels at h % of the cumulation histograms of the chroma signals 17R, 17G and 17B, and $\text{histo}(Y)_h{}^|$ is the input video signal level at h % of the cumulation histogram of the luminance signal 27. Specifically, $\text{histo}(R)_h{}^|$, $\text{histo}(G)_h{}^|$ and $\text{histo}(B)_h{}^|$ are representative of, respectively, the outputs 29R, 29G and 29B which show the input video signal levels at h % of the cumulation histograms prepared, respectively, by the cumulation histogram preparing sections 34R, 34G and 34B from the signals 17R, 17G and 17B. On the other hand, $\text{histo}(Y)_h{}^|$ is representative of the output 31 which shows the input video signal level at h % of the cumulation histogram prepared by the cumulation histogram preparing section 36 from the luminance signal 27.

As to the value h stated above, a frequency value at or close to the highlight point is selected for the decision of the presence/absence of highlight white, and a frequency value at or close to the shadow point is selected for the decision of the presence/absence of shadow black. This value h is entered on the operating unit 56 by the operator.

Assuming that the presence/absence of highlight white is to be decided by selecting a highlight point which corresponds to a frequency of 99%, the input video signal levels $\text{histo}(R)_h{}^|$, $\text{histo}(G)_h{}^|$, and $\text{histo}(B)_h{}^|$ corresponding to 99% of the respective cumulation histograms which are derived from the chroma signals 17R, 17G and 17B are multiplied by 0.3, 0.59 and 0.11, respectively. Then, from the sum of the resultant products, the input video signal level $\text{histo}(Y)_h{}^|$ corresponding to 99% of the accumulation histogram associated with the luminance signal 27 is substracted to produce $\Delta_h{}^|$.

The arithmetic operations mentioned above are performed by the highlight and shadow point deciding section 38. Specifically, this section 38 multiplies the outputs 29R, 29G and 29B of the cumulation histogram preparing sections 34R, 34G and 34B by, respectively 0.3, 0.59 and 0.11, then adds the products together, and then substracts the output 31 of the cumulation histogram preparing section 36 from the sum. The highlight and shadow point deciding section 38 decides whether highlight white is present or not, based on the value $\Delta_h{}^|$ which is produced by the above operations. The value $\Delta_h{}^|$ is equal to or greater than zero. When the value $\Delta_h{}^|$ is zero, the section 38 decides that highlight white is present. This is because when an image represented by input video signals includes highlight white, i.e., perfect white, the highlight points of the chroma signals and that of the luminance signal coincide with each other and, therefore, the value $\Delta_h{}^|$ is zero.

The procedure for deciding the presence/absence of a highlight point as stated above applies to the decision of the presence/absence of a shadow point as well. Specifically, the operator enters, for example, 1% on the operating unit 56 as the value of h., and the highlight and shadow point deciding section 38 decides the presence/absence of a shadow point.

It is to be noted that the coefficients of 0.3, 0.59 and 0.11 adopted in the equation are selected simply to agree with those for producing a luminance signal and may be replaced with other suitable values.

The highlight and shadow point deciding section 38 determines the degree of correction based on the value of $\Delta_h{}^|$ and, then, delivers to the correction adjusting section 40 a signal 33 which is representative of the degree of correction determined. The degree of correction becomes low (low correction) with the increase of the value of $\Delta|$ and becomes high (high correction) with the decrease of the same. In response to the output 33 of the deciding section 38, the correction adjusting section 40 adjusts the output signals 17R, 17G and 17B of the frame memories 12R, 12G and 12B with respect to the degree of color correction level by the luminance signal 27, which is output by the luminance signal producing section 32.

In the case of perfect high correction, the correction adjusting section 40 delivers the chroma signals from the individual frame memories 12R, 12G and 12B to the cumulation histogram preparing sections 42R, 42G, 42B. In response, the cumulation histogram preparing sections 42R, 42G, 42B prepares look-up tables LUTR, LUTG and LUTB adapted for the tone correction of the individual input color signals, referencing the highlight and shadow points which are determined on the basis of the cumulation histogram of each of the chroma signals 17R, 17G and 17B. In the case of perfect low correction, on the other hand, the correction adjusting section 40 feeds the luminance signal 27 from the luminance signal producing section 32 to the cumulation histogram preparing sections 42R, 42G, 42B. Then, these sections 42R, 42G, 42B prepares look-up tables LUTR, LUTG and LUTB for the tone correction of the individual input color signals, based on the highlight and shadow points as obtained from the cumulation histogram of the luminance signal 27. Such a procedure associated with perfect low correction will be described in detail later.

The correction adjusting section 40 comprises a decode matrix adapted to produce, from each of the chroma signals output by the frame memories 12R, 12G and 12B, an adjusted chroma signal C' as represented by:

$$C' = kC + (1-k)Y \qquad \text{Eq. (1)}$$

where k is a coefficient for adjusting the degree of correction level. Specifically, the coefficient k is selected by the highlight and shadow point deciding section 38 within the range of $0 \leq k \leq 1$, depending on the degree of correction level and according to the value of $\Delta_h{}^l$. The coefficient k determined so is fed to the correction adjusting section 40.

For high correction, the coefficient k is selected to be 1. In this condition, the color signals 17R, 17G and 17B from the frame memories 12R, 12G and 12B are directly applied to, respectively, cumulation histogram preparing sections 42R, 42G and 42B as the outputs 35R, 35G and 35B of the correction adjusting section 40. For low correction, on the other hand, the coefficient k is selected to be 0. Then, the color signals 17R, 17G and 17B from the frame memories 12R, 12G and 12B are replaced with the luminance signal 27 from the luminance signal producing section 32 by the correction adjusting section 40, resulting that the luminance signal 27 is delivered as the outputs 35R, 35G and 35B of the correction adjusting section 40. Again, these signals 35R, 35G and 35B are applied to the cumulation histogram preparing sections 42R, 42G and 42B.

The cumulation histogram preparing sections 42R, 42G and 42B prepare cumulation histograms from, respectively, the signals 35R, 35G and 35B which are applied thereto from the correction adjusting section 40. The outputs 37R, 37G and 37B of the sections 42R, 42G and 42B each being representative of a highlight point of 99% and a shadow point of 1% are fed to LUT converting sections 46R, 46G and 46B, respectively.

The cumulation histogram preparing sections 34R, 34G and 34B and the cumulation histogram preparing sections 42R, 42G and 42B may always replace each other. The correction adjusting section 40 comprises a 3×3 matrix. Hence, assuming that the 3×3 matrix constitutes a unit matrix, the situation shown in FIG. 1 is equivalent to a one wherein the correction adjusting section 40 is connected directly to the cumulation histogram preparing sections 34R, 34G and 34B, respectively. When the luminance signal producing section 32, like the correction adjusting section 40, is arranged to effect coefficient change on a 3×3 matrix basis, any of the cumulation histogram preparing sections 34R, 34G and 34B may replace the cumulation histogram preparing section 36.

A standard look-up table storing section 44 stores therein a look-up table LO which serves as a standard for tone correction. The output 39 of the standard look-up table storing section 44 is fed to the LUT converting sections 46R, 46G and 46B. The LUT converting sections 46R, 46G and 46B convert the output 39, or standard look-up table LO, of the storing section 44, taking account of the outputs 37R, 37G and 37B of the cumulation histogram preparing sections 42R, 42G and 42B which are representative of a highlight and a shadow point each. This provides look-up table data associated with the picture.

Figure 4:
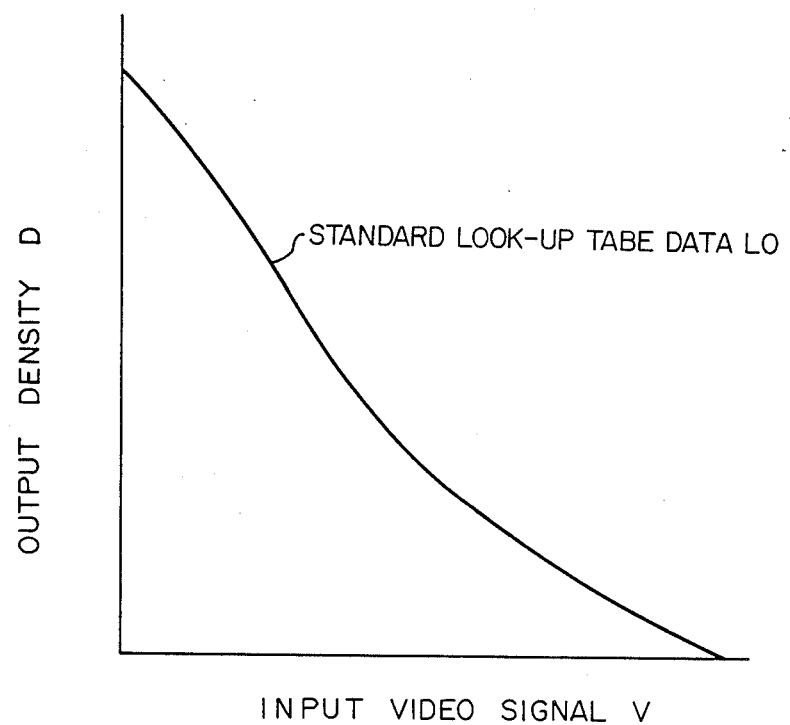
FIG. 4 is a plot showing a standard look-up table LO which is stored in a standard look-up table storing section of FIG. 1.

As shown in FIG. 4, the standard look-up table data read out of the standard look-up table storing section 44 are represented by a standard curve, which is expressed as:

$$D = -2.2 \log v$$

where v is the level of an input video signal, D is the output density, and the coefficient 2.2 is the video gamma coefficient.

The LUT converting sections 46R, 46G and 46B convert the standard curve LO by using the values of highlight and shadow points which are output by the individual cumulation histogram preparing sections 42R, 42G and 42B, such that the curve LO extends through the associated highlight and shadow points. The outputs 41R, 41G and 41B of the LUT converting sections 46R, 46G and 46B are delivered to the tone correcting sections 14R, 14G and 14B, respectively. In response, the tone correcting sections 14R, 14G and 14B correct, respectively, the tones of the input signals 17R, 17G and 17B based on the look-up data output 41R, 41G and 41B of the LUT converting sections 46R, 46G and 46B. The outputs 19R, 19G and 19B of the tone correcting sections 14R, 14G and 14B are routed to, respectively, the DA converters 20R, 20G and 20B via the color correcting sections 16R, 16G and 16B and tone correcting sections 18R, 18G and 18B. The outputs 25R, 25G and 25B of the DA converters 20R, 20G and 20B are fed to the switch 22 on one hand and to the video monitor 50 on the other hand. As stated earlier, the switch 22 applies the analog signals 25R, 25G and 25B alternatively to the CRT 24 to form a color image in the printing paper 30.

As described above, in accordance with this embodiment, the highlight and shadow point deciding section 38 compares chroma signals and a luminance signal to thereby decide whether or not a highlight and a shadow point are present. In the case of high correction in which a highlight or a shadow point is present, the correction adjusting section 40 selects 1 as the value of k for correction adjustment. Then, as previously mentioned, the correction adjusting section 40 delivers the color signals from the individual frame memories 12R, 12G and 12B directly so as to prepare cumulation histograms, determine their highlight and shadow points, and produce look-up table data. This allows the tone correcting sections 14R, 14G and 14B to adequately correct the tones of their associated color signals, whereby any deviation of an image represented by the input signals from an actual one with respect to tone is corrected.

Assume that an image represented by input video signals does not include a perfect white portion and includes, for example, a gray portion of R=G=B=0.9 which is close to white, and that it includes a red portion of high chroma where R=1.0 and G=B=0. In this condition, should a value close to 1 be selected for k, the image would be overcorrected to appear lessened in red and intensified in cyan. In such a situation, therefore, the output 33 of the highlight and shadow point deciding section 38 commands the correction adjusting section 40 selection of k having a small value, thereby preventing overcorrection from occurring. It is to be noted that when k of a small value is selected, the highlight point is obtained from a signal which is close to the luminance signal Y and, hence, the output density D of the tone correcting sections 14R, 14G and 14B should preferably be set relatively low to intensity the highlight density of the image.

In accordance with this embodiment, the highlight and shadow point deciding section 38 determines a particular degree of correction level while the correction adjusting section 40 adjusts the degree of correction level in response to the output of the above section 38. This allows the tone correcting sections 14R, 14G and 14B to perform adequate tone correction. For example, even if an image represented by input video signals includes a light red portion having high chroma, the tone correcting sections 14R, 14G and 14B are prevented from overcorrecting the tones and, therefore, from disturbing the color balance.

Since the value of k is selected adequately in response to a particular degree of color correction level determined as stated above, the deviation of tones represented by the input video signals 11R, 11G and 11B due to the difference in photographing conditions can be correctly compensated for without entailing overcorrection. That is, the image processing procedure shown and described has little scene dependency and frees a recorded image from unnatural appearance.

A prior art procedure is such that, while watching the video display, the operator decides the presence/absence of a highlight point in terms of the presence/absence of a perfect white portion point and, based on the result of the decision, selects and enters a particular value of k on the operating unit 56 by his own discretion. In this case, the correction adjusting section 40 is caused to adjust the degree of correction level on the basis of the correction level which is selected by the operator. The operator, therefore, cannot make the decision without skill; any inadequate decision would prevent tone correction which is optimum for a particular image from being achieved.

In contrast, in this embodiment of the present invention, the previously stated arithmetic operations are performed by use of cumulation histograms of chroma signals and luminance signal, thereby determining the degree of correction level. Such eliminates the need for the operator's decision as to the presence/absence of a highlight and a shadow point, which often results in inadequate tone correction as mentioned.

While the embodiment of the present invention has been shown and described in relation to an image recording apparatus of the type recording a visible image in an image recording medium, it is also applicable to the processing of various kinds of images which may be displayed on a CRT.

In summary, it will be seen that the present invention provides an image processing method and an apparatus for the same which perform tone correction optimum for any particular image while freeing the operator from the decision as to the presence/absence of a highlight and a shadow point otherwise made while watching an image picture and, thereby, precluding the fear of erroneous decision.

While the present invention has been described with reference to the particular illustrative embodiment, it is not to be restricted by that embodiment but only by the appended claims. It is to be appreciated that those skilled in the art can change or modify the embodiment without departing from the scope and spirit of the present invention.

What is claimed is:

1. An image processing method for processing input chroma signals based on look-up table data and for outputting said processed chroma signals, comprising the steps of:
producing chroma signals, each corresponding to a selected frequency value in a respective cumulation histogram which is prepared from a respective one of the input chroma signals, and producing a luminance signal corresponding to a selected frequency value in a cumulation histogram which is prepared from a luminance signal produced from said input chroma signals;
comparing said chroma signals corresponding to the selected frequency values with said luminance signal corresponding to the selected frequency value in accordance with an arithmetic relationship to determine a degree of color correction for the input chroma signals;
producing adjusted chroma signals by adjusting the levels of the input chroma signals in accordance with the determined degree of color correction;
setting a highlight point and a shadow point for each of the input chroma signals based on the adjusted chroma signals;
preparing look-up table data for each of the input chroma signals on the basis of said set highlight and shadow points; and
processing said input chroma signals by using said look-up table data.

2. A method in accordance with claim 1, wherein said method is used with an image recording method which reproduces a visible image on an image recording medium from the processed chroma signals.

3. A method in accordance with claim 2, wherein the step of processing said input chroma signals by using the look-up table data comprises a step of producing density signals by converting, based on said look-up table data, the input chroma signals into signals each being representative of the intensity of light to be projected onto the image recording medium and applying tone correction corresponding to particular photographing conditions to the converted signals.

4. A method in accordance with claim 3, wherein the step of setting a highlight point and a shadow point comprises a step of preparing cumulation histograms from the adjusted chroma signals and setting a highlight point and a shadow point for each of the input chroma signals based on a respective one of said cumulation histograms prepared in the step of setting a highlight point and a shadow point.

5. A method in accordance with claim 4, wherein the degree of color correction is determined on the basis of a value of $\Delta_h{}^i$ which is expressed as:

$$\Delta_h| = 0.3 \text{ histo}(R)_h| + 0.59 \text{ histo}(G)_h| + 0.11 \text{ histo}(B)_h| - \text{histo}(Y)_h|$$

where $\text{histo}(R)_h|$, $\text{histo}(G)_h|$ and $\text{histo}(B)_h|$ are the input chroma signal levels at a selected frequency value of h % of the respective cumulation histograms prepared from the input chroma signals, and $\text{histo}(Y)_h|$ is the luminance signal level at a selected frequency value of h % of the cumulation histogram prepared from the luminance signal.

6. A method in accordance with claim 5, wherein the step of producing adjusted chroma signals by adjusting the levels of the input chroma signals comprises a step of adjusting the input chroma signals, hereinafter referred to as C, to adjusted chroma signals C' each corresponding to a respective one of said input chroma signals C as a function of the luminance signal, hereinafter referred to as Y, which is produced from said input chroma signals in accordance with the equation:

$$C' = kC + (1-k)Y,$$

the value of k being a function of the value of $\Delta_h|$.

7. A method in accordance with claim 5, wherein the step of producing adjusted chroma signals by adjusting the levels of the input chroma signals comprises a step of utilizing the input chroma signals as the adjusted chroma signals when $\Delta_h|$ has a first value indicating a high degree of color correction, and a step of utilizing the luminance signal produced from the input chroma signals as the adjusted chroma signals when $\Delta_h|$ has a second value indicating a low degree of color correction.

8. An image processing apparatus for processing input chroma signals based on look-up table data and for outputting said processed chroma signals, said apparatus comprising:
chroma signal cumulation histogram preparing means for preparing a respective cumulation histogram from each one of the input chroma signals;
luminance signal cumulation histogram preparing means for preparing a cumulation histogram from a luminance signal produced from the input chroma signals;
color correction degree determining means for determining a degree of color correction for the input chroma signals by comparing, in accordance with an arithmetic relationship, chroma signals each corresponding to a selected frequency value in a respective one of the cumulation histograms prepared by the chroma signal cumulation histogram preparing means with a luminance signal corresponding to a selected frequency value in the cumulation histogram prepared by the luminance signal cumulation histogram preparing means;
chroma signal adjusting means for producing adjusted chroma signals by adjusting the levels of the input chroma signals in accordance with the degree of color correction determined by said color correction degree determining means;
highlight and shadow point setting means for setting a highlight point and a shadow point for each of said input chroma signals based on the adjusted chroma signals;
look-up table means for preparing look-up table data for each one of the input chroma signals on the basis of the highlight and shadow points which are set by said highlight and shadow point setting means; and
means for processing the input chroma signals by using the look-up table data.

9. An apparatus in accordance with claim 8, further comprising an image recording apparatus for reproducing a visible image on an image recording medium from the processed chroma signals.

10. An apparatus in accordance with claim 9, wherein the processing means comprises tone correcting means in which the look-up table data is stored, said tone correcting means producing density signals by converting, based on the look-up table data, the input chroma signals into signals which are representative of the intensity of light to be projected onto the image recording medium and applying tone correction corresponding to particular photographic conditions to the converted signals.

11. An apparatus in accordance with claim 10, wherein the highlight and shadow point setting means prepares cumulation histograms from the adjusted chroma signals and sets a highlight point and a shadow point for each of the input chroma signals based on a respective one of the cumulation histograms prepared by the highlight and shadow point setting means.

12. An apparatus in accordance with claim 11, wherein the color correction degree determining means determines the degree of color correction based on a value of $\Delta_h|$ which is expressed as:

$$\Delta_h| = 0.3 \text{ histo}(R)_h| + 0.59 \text{ histo}(G)_h| + 0.11 \text{ histo}(B)_h| - \text{histo}(Y)_h|$$

wherein $\text{histo}(R)_h|$, $\text{histo}(G)_h|$ and $\text{histo}(B)_h|$ are the input chroma signal levels at a selected frequency value of h % of the respective cumulation histograms of the chroma signals prepared by the chroma signal cumulation histogram preparing means, and $\text{histo}(Y)_h|$ is the luminance signal level at a selected frequency value of h % of the cumulation histogram of the luminance signal prepared by the luminance signal cumulation histogram preparing means.

13. An apparatus in accordance with claim 12, wherein the chroma signal adjusting means adjusts the levels of the input chroma signals by adjusting the input chroma signals, hereinafter referred to as C, to adjusted chroma signals C' each corresponding to a respective one of the input chroma signals C as a function of the luminance signal, hereinafter referred to as Y, which is produced from said input chroma signals in accordance with the equation:

$$C' = kC + (1-k)Y,$$

the value of k being a function of the value of $\Delta_h|$.

14. An apparatus in accordance with claim 12, wherein the chroma signal adjusting means adjusts the levels of the input chroma signals when $\Delta_h|$ has a first value indicating a high degree of color correction by utilizing the input chroma signals as the adjusted chroma signals, and adjusts the levels of the input chroma signals when $\Delta_h|$ has a second value indicating a low degree of color correction by utilizing the luminance produced from the input chroma signals as the adjusted chroma signals.

* * * * *